(12) United States Patent
Peralta et al.

(10) Patent No.: US 12,191,486 B2
(45) Date of Patent: Jan. 7, 2025

(54) METHOD FOR PREPARING A POSITIVE ELECTRODE ACTIVE MATERIAL OF THE LITHIATED METAL OXIDE TYPE COMPRISING TITANIUM

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: David Peralta, Grenoble (FR); Carole Bourbon, Grenoble (FR); Jean-François Colin, Grenoble (FR); Nathalie Herlin-Boime, Grenoble (FR); Jérémie Fondard, Grenoble (FR)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 628 days.

(21) Appl. No.: 17/488,607

(22) Filed: Sep. 29, 2021

(65) Prior Publication Data
US 2022/0102720 A1 Mar. 31, 2022

(30) Foreign Application Priority Data

Sep. 29, 2020 (FR) ..................................... 2009897

(51) Int. Cl.
*H01M 4/525* (2010.01)
*C01G 53/00* (2006.01)
*H01M 4/485* (2010.01)
*H01M 4/505* (2010.01)
*H01M 10/0525* (2010.01)
*H01M 4/02* (2006.01)

(52) U.S. Cl.
CPC ............ *H01M 4/525* (2013.01); *C01G 53/42* (2013.01); *C01G 53/50* (2013.01); *C01G 53/54* (2013.01); *H01M 4/485* (2013.01); *H01M 4/505* (2013.01); *H01M 10/0525* (2013.01); *C01P 2002/20* (2013.01); *C01P 2002/32* (2013.01); *C01P 2002/52* (2013.01); *C01P 2006/40* (2013.01); *H01M 2004/028* (2013.01)

(58) Field of Classification Search
CPC ...... H01M 4/525; H01M 4/485; H01M 4/505; H01M 10/0525; C01G 53/42; C01G 53/50; C01G 53/54
See application file for complete search history.

(56) References Cited

U.S. PATENT DOCUMENTS

| 2008/0116418 | A1* | 5/2008 | Tabuchi | ............... H01M 4/485 |
|---|---|---|---|---|
| | | | | 252/182.1 |
| 2011/0226985 | A1 | 9/2011 | Park et al. | |
| 2019/0372112 | A1 | 12/2019 | Peralta et al. | |
| 2021/0210781 | A1 | 7/2021 | Martinet et al. | |
| 2021/0261434 | A1 | 8/2021 | Peralta | |

FOREIGN PATENT DOCUMENTS

| EP | 1927581 | A2 | 6/2008 |
|---|---|---|---|
| EP | 3246973 | A1 | 11/2017 |

OTHER PUBLICATIONS

Chen et al., Int. J. of Minerals, M et al. And Matterials, (2009), 16(4), p. 452-457. (Disclosed in IDS).*
Search Report for French application No. FR2009897 dated Jun. 15, 2021.
Kim, J. et al., "The effect of tetravalent titanium substitution in $LiNi_{1-x}Ti_xO_2$ (0:025 < x < 0.2) system" Electrochemistry Communications, vol. 3, Issue 2, Feb. 2001, p. 52-55.
Chang, Soon Ho et al. "Crystal structure and spectroscopic properties of Li, Ni 1 _yTiyOZ and their electrochemical behavior" Solid State Ionics, vol. 86-88, Part 1, Jul. 1996, pp. 171-175.
Chen, Meng et al., "Synthesis and electrochemical properties of LiNiSynthesis and electrochemical properties of $LiNi_{o-8}Al_{o-2-x}Ti_xO_2$cathode materials by an ultrasonic-assisted co-precipitation method" International Journal of Minerals, Metallurgy and Materials, vol. 16, Issue 4, Aug. 2009, p. 452-457.

* cited by examiner

*Primary Examiner* — Yong L Chu
(74) *Attorney, Agent, or Firm* — Pearne & Gordon LLP

(57) ABSTRACT

A method for preparing a positive electrode active material for a lithium battery consisting of a lithiated oxide comprising titanium and optionally one or more other metal elements comprising the following successive steps: a) a step of forming a precipitate comprising titanium and the optional other metal element(s) by contacting a titanium coordination complex and, if necessary, at least one salt of the other metal element(s) with an aqueous medium; b) a step of recovering the precipitate thus formed; c) a step of calcining the precipitate in the presence of a lithium source.

14 Claims, 13 Drawing Sheets

METHOD FOR PREPARING A POSITIVE ELECTRODE ACTIVE MATERIAL OF THE LITHIATED METAL OXIDE TYPE COMPRISING TITANIUM

TECHNICAL FIELD AND STATE OF PRIOR ART

The present invention is concerned with a method for preparing a positive electrode active material for a lithium battery (and more specifically, a lithium-ion battery) consisting of a lithiated metal oxide comprising titanium.

Lithium-ion batteries are particularly interesting in fields where autonomy is a primary criterion, such as in the field of nomadic devices (such as mobile phones, laptops) or in the field of transportation such as electric vehicles, hybrid vehicles, or in the medical, space or microelectronics fields.

From a functional point of view, lithium-ion batteries are based on the lithium intercalation-deintercalation principle within the constituent materials of the electrodes of the electrochemical cells of the battery, which materials can be referred to as active materials.

More precisely, the reaction giving rise to current generation (that is when the battery is in a discharge mode) involves transfer, via a lithium ion-conducting electrolyte, of lithium cations from a negative electrode that intercalate into the acceptor lattice of the positive electrode, while electrons from the reaction at the negative electrode supply the external circuit, to which the positive and negative electrodes are connected.

In lithium-ion batteries, the most critical and limiting element turns out to be the positive electrode and, more specifically, the active material of the positive electrode, the successive lithiation/delithiation of which can lead to ageing. More specifically, transition metal atoms present in the active material can migrate from one crystallographic site to another and can eventually slow down and block access to some lithium sites, thus contributing to a decrease in the performance of the material, and consequently that of the battery, during cycles.

To stabilise these materials, dopants for stabilising the structure can be introduced therein, such as titanium, which is effectively a component of commonly used positive electrode active materials and, more particularly:

lamellar oxides of the formula Li(Ni, Co, Mn, Ti)$O_2$, in which titanium may be present up to a few percent, titanium thus acting as a dopant or in which titanium may replace manganese and/or nickel and/or cobalt in the above formula;

spinel type oxides of the formula Li(Ni, Co, Mn, Ti)$O_4$, in which titanium may be present up to a few percent, titanium thus acting as a dopant, or in which titanium may replace manganese and/or nickel and/or cobalt in the above formula.

These oxides can be prepared through different pathways.

For example, a so-called "all-solid" method can be contemplated, in which precursors comprising the metal elements to be comprised in the desired oxide are reacted in a solid pathway, such as:

in *Electrochemistry Communications*, Vol. 3, Issue 2, February 2001, p. 52-55, which describes the preparation of lamellar oxides of the formula LiNi$_{1-x}$Ti$_x$O$_2$ (0.025≤x≤0.2) by the solid-state reaction route at 750° C. under oxygen stream of the precursors LiOH, Ni(OH)$_2$ and TiO$_2$;

in *Solid State Ionics*, Vol. 86-88, Part 1, July 1996, p. 171-175, which describes the preparation of lamellar oxides of the formula LiNi$_{1-y}$Ti$_y$O$_2$ (0.1≤y≤0.5) by the solid-state reaction route of Li$_2$CO$_3$, NiO and TiO$_2$.

Alternatively, a method involving co-precipitation can also be contemplated, such as in *International Journal of Minerals, Metallurgy and Materials*, Vol. 16, Issue 4, August 2009, p. 452-457, which describes the preparation of an oxide of the formula LiNi$_{0.8}$Al$_{0.2-x}$Ti$_x$O$_2$ (x=0.0-0.20) by ultrasound assisted co-precipitation reaction of the precursors Ni(NO$_3$)$_2$, Al(NO$_3$)$_3$, LiOH·H$_2$O and TiO$_2$.

Also, in view of what already exists, the authors of the present invention have set the objective of providing a method for preparing a positive electrode active material consisting of a lithiated oxide comprising titanium, which can be performed through liquid pathway and is simple to implement and does not require complex and expensive equipment.

DISCLOSURE OF THE INVENTION

This objective is achieved by a method for preparing a positive electrode active material for a lithium battery consisting of a lithiated oxide comprising titanium and optionally one or more other metal elements comprising the following successive steps:

a) a step of forming a precipitate comprising titanium and the optional other metal element(s) by contacting a titanium coordination complex and, if necessary, at least one salt of the other metal element(s) with an aqueous, advantageously basic, medium;

b) a step of recovering the precipitate thus formed;

c) a step of calcining the precipitate in the presence of a lithium source.

In the foregoing and the following, by titanium coordination complex, it is meant a compound comprising titanium in the form of a cation (more specifically, titanium in the +IV oxidation level), titanium being bonded to molecules via coordination bonds, these molecules can be referred to as ligands. More specifically, the valence electrons used for forming the coordination bonds come only from atoms belonging to the ligands, for example, via their free doublets and/or their negative charges.

By salt, it is meant, in the foregoing and the following, a compound comprising a metal element in cationic form combined with one or more anions to form a neutral and uncharged product, the bonds established between the metal element and the anion(s) being ionic bonds.

In the foregoing and the following, by a positive electrode, it is meant the electrode which acts as the cathode when the battery draws current (that is when in the discharging process) and which acts as the anode when the battery is in the charging process.

The optional other metal element(s) (it being understood, other than titanium) of the material in accordance with the method of the invention may be selected from transition metal elements (such as manganese, cobalt, nickel, iron, copper and mixtures thereof), post-transition metal elements (such as aluminium) and mixtures thereof. More specifically, the metal element(s) may be selected from manganese, cobalt, nickel and mixtures thereof.

Specifically, the lithiated oxides comprising titanium likely to be obtained at the end of the method of the invention may be:

lamellar oxides of the formula LiTiMO$_2$, in which M can denote Co, Ni, Mn, Al, Cu, Fe and mixtures thereof, such as Li(Ni,Mn,Co,Ti)O$_2$ as LiNi$_{0.8}$Mn$_{0.08}$Co$_{0.1}$Ti$_{0.02}$O$_2$, Li(Ni, Ti)O$_2$ as $LiNi_{0.9}Ti_{0.1}O_2$, $Li(Ni, Co, Ti)O_2$ as $LiNi_{0.8}Co_{0.1}Ti_{0.1}O_2$, $LiNi_{0.9}Co_{0.05}Ti_{0.05}O_2$;

spinel type oxides of the formula $LiTiMO_4$, in which M can be Ni, Mn, Co, Cu, Al, Fe and mixtures thereof, such as $Li(Ni, Mn, Ti)O_4$ as $LiNi_{0.5}Mn_{1.3}Ti_{0.2}O_4$, $Li(Ni, Ti)O_4$ as $LiNi_{0.5}Ti_{1.5}O_4$.

Firstly, the method of the invention comprises a step of forming a precipitate comprising titanium and the optional other metal element(s) by contacting a titanium coordination complex and, if necessary, at least one salt of the other metal element(s) with an aqueous, advantageously basic, medium. It is set out that by basic aqueous medium, it is conventionally meant a medium the pH of which is strictly greater than 7 and, preferably, greater than or equal to 7.5.

The titanium coordination complex advantageously comprises at least one ligand comprising at least two groups establishing coordination bonds with titanium, the coordination bonds being conventionally established between free doublets and/or negative charges carried by these groups, this ligand or these ligands can be referred to as polydentate ligands (due to the fact that they comprise several groups establishing coordination bonds with titanium and, more specifically, as bidentate ligands when they comprise only two of these groups).

Among advantageous ligands, there can be mentioned, more specifically, a bidentate ligand comprising a carboxylate group and an alcoholate (or alkoxide) group, which groups provide coordination with titanium.

Thus, the titanium coordination complex may comprise at least one bidentate ligand comprising a carboxylate group and an alcoholate group.

Further, the titanium coordination complex may comprise at least one ligand comprising a single group establishing one coordination bond with titanium, for example, an —OH group.

More particularly, the titanium coordination complex is a complex comprising:
  at least one bidentate ligand comprising at least two groups establishing coordination bonds with titanium and, more specifically comprising two groups, such as a carboxylate group and an alcoholate group; and
  at least one ligand comprising a single group establishing one coordination bond with titanium, such as an —OH group.

Even more particularly, the titanium coordination complex is a complex comprising two bidentate ligands each comprising two groups establishing coordination bonds with titanium and, more specifically comprising two groups, such as a carboxylate group and an alcoholate group and comprising two ligands each comprising a single group establishing one coordination bond with titanium, such as an —OH group.

Besides, the coordination complex may comprise one or more cations to neutralize, if necessary, the backbone consisting of titanium and its ligands, and these cation(s) may be ammonium cations.

A titanium coordination complex efficient for the implementation of the method of the invention is a complex having the following formula (I):

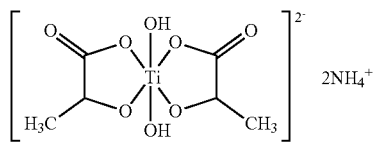

This type of complex has the feature of being easily soluble in an aqueous medium.

If necessary, the salt(s) of the other metal element(s) may be nitrates, carbonates, chlorides or sulphates of the other metal element(s) and, more specifically, sulphates.

It is set out that when the formation of the precipitate involves both titanium and one or more other metal elements, this formation can be referred to as co-precipitation.

Precipitation or co-precipitation allows, after calcination of the precipitate with the lithium source, the production of materials having primary particles (crystallites) agglomerated into secondary particles having a spherical shape (about 6-10 μm). One of the advantages of such a morphology is the improvement of these particles in forming a compact assembly. As the volume of a battery is a fixed volume, the energy carried by the battery will necessarily depend on the amount of active materials contained in the battery. By increasing the density of the active material powders, it is therefore possible to maximise the amount of material in the cells and thus increase the energy carried by the battery. As another important advantage, the (co)precipitation synthesis allows all chemical elements of a material, especially titanium in the present case, to be ideally mixed together, because all the elements are previously dissolved and mixed through the liquid-state route.

When the formation of the precipitate involves both titanium and one or more other metal elements, the method may comprise, prior to the precipitate formation step as such, a step of preparing a solution comprising the salt(s) of the other metal element(s), for example, by dissolving said salt(s) in water.

In this case, the precipitate formation step is carried out by contacting the solution comprising the salt(s) of the metal elements and the titanium coordination complex with an aqueous, preferably basic, precipitating medium.

Regardless of the embodiment, the aqueous medium may be obtained by adding at least one basic solution, for example, a soda solution, an ammonia solution or a mixture thereof.

Regardless of the embodiment, the precipitate formation step may be carried out under inert gas (for example nitrogen or argon).

This precipitate formation step may be implemented in a precipitation reactor, in which the following successive operations may, in particular, be implemented:
  an operation of injecting, into the reactor, a solution comprising the titanium coordination complex and, if necessary, the optional other metal element(s);
  an operation of injecting, into the reactor, at least one basic solution, in which this operation can be continuous throughout the duration of the step to maintain a basic pH;
  an operation of stirring the mixture thus formed at a suitable temperature and for a suitable duration and under an inert atmosphere, until the precipitate is completely formed.

These suitable temperature and duration can be determined by prior tests allowing the temperature and duration pair required for the complete formation of the precipitate to be set for a given amount of complex and, if necessary, of salt(s) and pH.

Alternatively, the solution comprising the titanium coordination complex and the solution comprising the other metal element(s) can be separated before introduction into the reactor and can be injected into the same via separate injection circuits.

The precipitate formed at the end of this step is a mixed hydroxide or carbonate comprising titanium and, if necessary, the other metal element(s).

Once the precipitate formation step is complete, the precipitate is recovered, for example, by filtration.

The precipitate thus recovered may then be subjected to washing with water, especially to remove ions adsorbed on the surface of the precipitate, and/or dried, for example, under vacuum.

Finally, the precipitate is subjected to a calcination step in the presence of a lithium source, so as to form the intended active material. In particular, the lithium source may be a lithium salt, such as lithium carbonate, lithium hydroxide or lithium acetate. The lithium source is advantageously used in excess, for example, an excess of up to 3 mole % relative to the stoichiometric amount.

It is understood that the temperature and duration of calcination will be chosen by the person skilled in the art in such a way as to obtain the oxide phase in the desired crystallised form, these temperature and duration being easily determined by the person skilled in the art by prior tests consisting in determining, as a function of the intended phase (the latter being detectable by X-ray diffractometry), the suitable temperature and duration pair.

By way of example, the calcination step can be carried out at a temperature ranging from 700° C. to 1000° C., and preferably from 800° C. to 1000° C. for a duration ranging from 4 hours to 24 hours. Preferably, this calcination step is carried out in the open air or in a controlled oxygen atmosphere.

The invention will now be described with reference to the following illustrative and non-limiting examples.

BRIEF DESCRIPTION OF DRAWINGS

The present invention will be better understood based on the following description and the appended drawings in which.

DETAILED DISCLOSURE OF PARTICULAR EMBODIMENTS

Example 1

Figure 1:
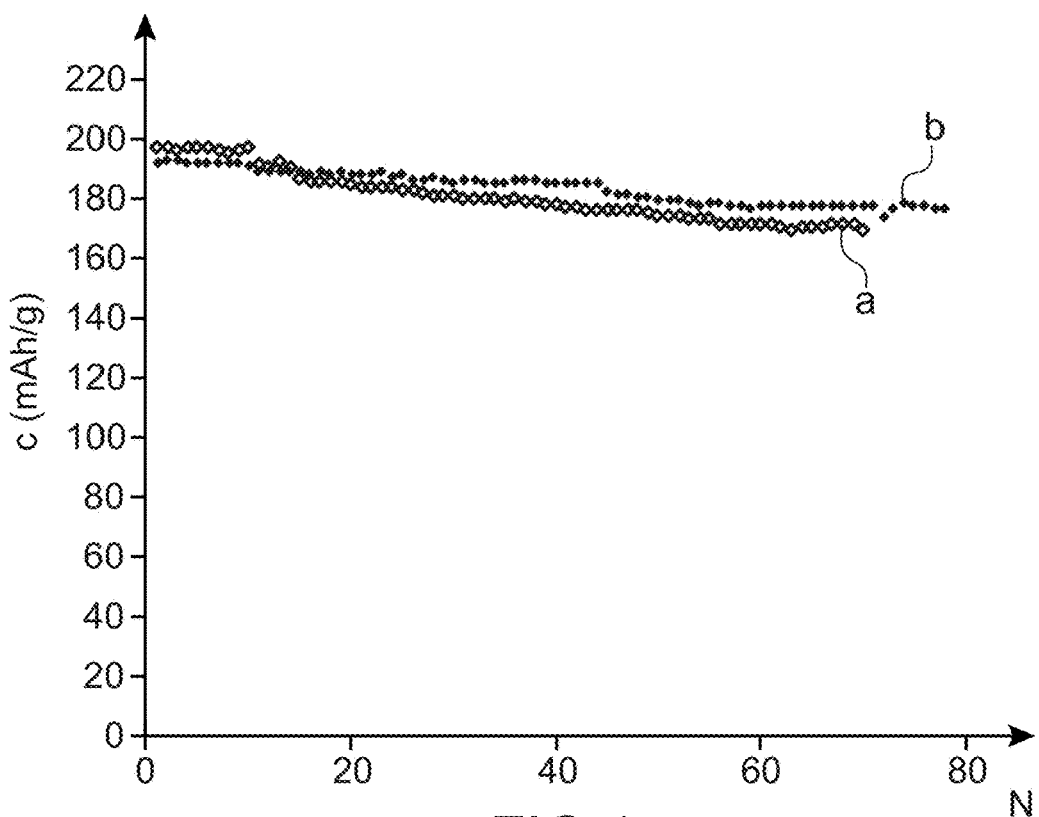
FIG. 1 is a graph illustrating, for example 1, the course of the capacitance C (in mAg/h) as a function of the number of cycles N, with curve a) corresponding to that obtained with the button cell comprising the non-titanium-doped material and the curve b) corresponding to that obtained with the button cell comprising the titanium-doped material.

The present example is directed to the preparation of a lamellar oxide of the formula $LiNi_{0.8}Mn_{0.08}Co_{0.1}Ti_{0.02}O_2$.

Firstly, a solution is prepared by dissolving nickel sulphate (169.9 g), manganese sulphate (10.9 g) and cobalt sulphate (22.7 g) in water (392.3 g). To this solution, is added a solution of diammonium bis(lactalo)dihydroxide titanate (9.4 g at 50 mass %) of the following formula:

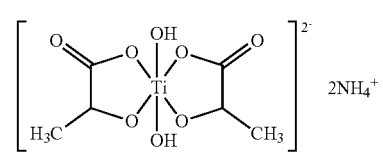

whereby the resulting solution is a 2M equimolar solution (having a volume of approximately 400 mL). A 5M soda solution is prepared separately as well as a dilute ammonia solution (150.2 g of 28 mass % ammonia diluted with 233.1 g of water).

The three solutions have separate injection circuits allowing the solutions to be pumped into a 5 L co-precipitation reactor, into which 1 L of water and 150 g of 28% ammonia have been previously introduced. The temperature is raised to 50° C. and the content of the reactor is maintained under stirring at 1000 rpm. An auxiliary circuit of inert gas (argon or nitrogen) is used to deoxygenate the solution while maintaining the reactor under an inert atmosphere. The solution containing the metal elements is pumped into the reactor up to 360 mL.

During the whole operation, the ammonia and soda solution are injected concurrently to maintain a constant pH of 11. Once the metal solution is introduced, the solution is maintained under stirring for 3 hours. The solution is then filtered and the precipitate washed with hot water to remove any sulphate and sodium ions potentially adsorbed on the surface of the material. The mixed hydroxide precipitate of the formula $Ni_{0.8}Mn_{0.08}Co_{0.1}Ti_{0.02}(OH)_2$ is then dried under vacuum at 80° C. overnight.

Secondly, the hydroxide of the formula $Ni_{0.8}Mn_{0.08}Co_{0.1}Ti_{0.02}(OH)_2$ is then mixed with lithium carbonate (3% molar excess relative to the stoichiometry) and then calcined under oxygen at 850° C. for 12 hours to form the compound $LiNi_{0.8}Mn_{0.08}Co_{0.1}Ti_{0.02}O_2$.

The material is then characterised by X-ray diffraction. The X-ray diffraction pattern obtained is characteristic of a lamellar oxide with the space group R-3 m.

Elemental analyses by ICP and XRF have been carried out on the material, the characterisations yielding the following chemical formulae for the synthesised material:

$LiNi_{0.79}Mn_{0.08}Co_{0.10}Ti_{0.02}O_2$ in the case of ICP;
$LiNi_{0.81}Mn_{0.07}Co_{0.10}Ti_{0.02}O_2$ in the case of XRF.

The material has then been characterised electrochemically in a button cell. To do so, the synthesised powder is mixed with a carbon source (SuperP®), PVDF 5130 in N-methyl-2-pyrrolidone (NMP). The mass composition of the mixture represents the following ratio 80/10/10 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into a glove box and a button cell is assembled by using lithium metal as the anode, Celgard 2400° as a separator and an electrolyte (1M $LiPF_6$ in a mixture of EC/PC/DMC carbonate solvents, EC corresponding to ethylene carbonate, PC to propylene carbonate and DMC to dimethyl carbonate).

Concurrently, a button cell has been made in the same way as above, except that the positive electrode active material is not doped with titanium, this material having the formula $LiNi_{0.8}Mn_{0.1}Co_{0.1}O_2$. A comparison of the performance of the button cell comprising the titanium-doped material and the button cell comprising the non-titanium-doped material cycled at C/10 between 4.3 V and 2.7 V is set forth in FIG. 1 appended hereto, which is a graph illustrating the course of the capacitance C (in mAg/h) as a function of the number of cycles N, with curve a) corresponding to that obtained with the button cell comprising the non-titanium-doped material and curve b) corresponding to that obtained with the button cell comprising the titanium-doped material.

It appears that the material with 2% titanium is more stable than the undoped material.

Figure 2:
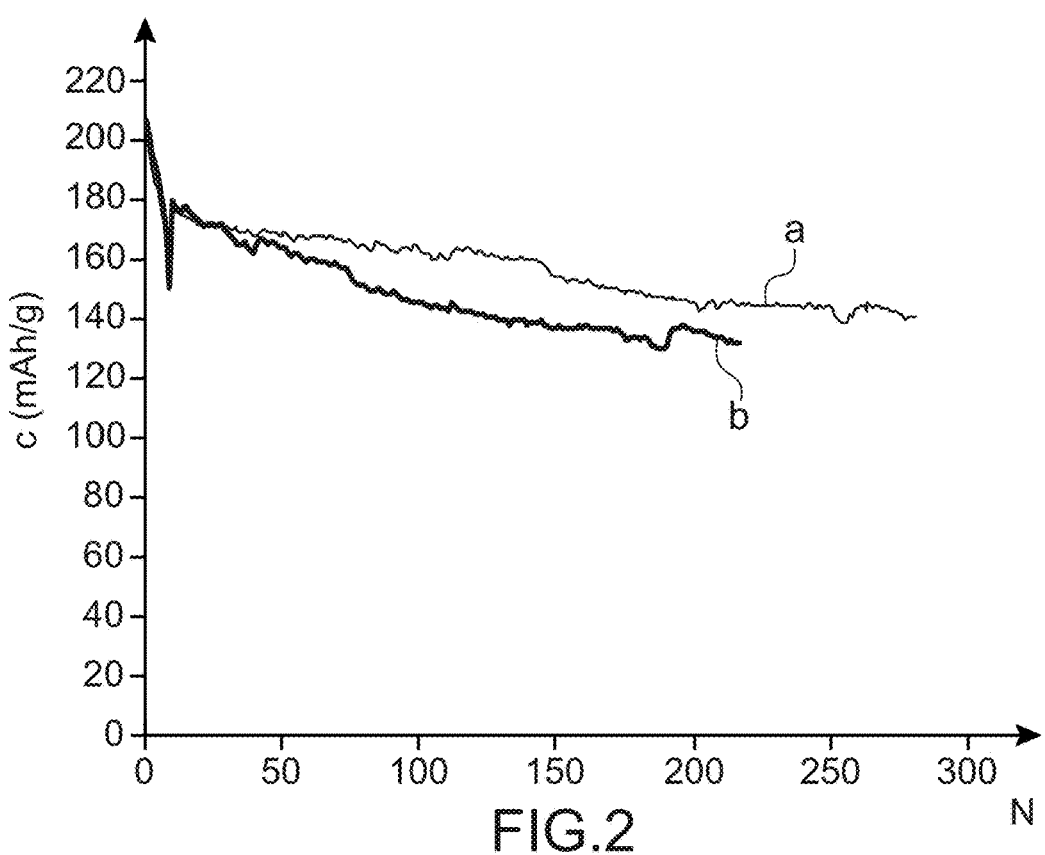
FIG. 2 is a graph illustrating, for Example 1, the course of the capacitance C (in mAh/g) as a function of the number of cycles N, with curve a) corresponding to the test at 4.3 V and curve b) corresponding to the test at 4.4V.
Figure 3:
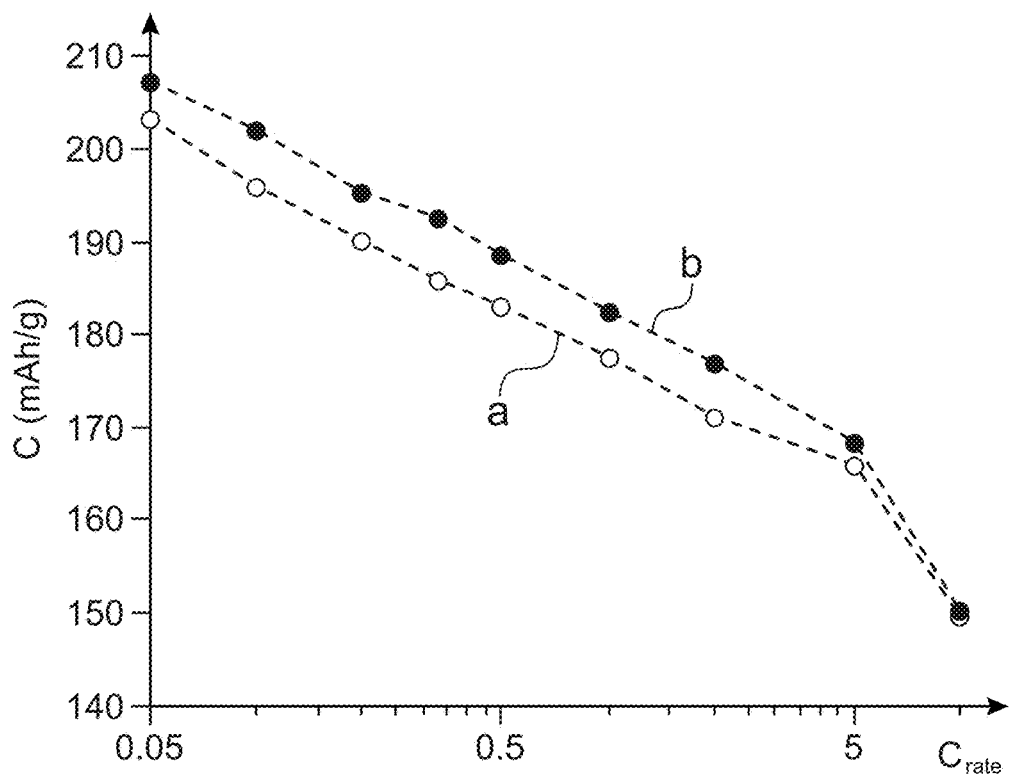
FIG. 3 is a graph illustrating, for example 1, the course of the capacitance C (in mAh/g) as a function of the charge/discharge rate applied (indicated by $C_{rate}$ on the ordinate)

The titanium-doped material is then evaluated for power, again in the same button cell, the results of the performance obtained at 4.3 V and 4.4 V at 1 C being illustrated in FIG. 2 appended hereto, which illustrates the course of the capacitance C (in mAh/g) as a function of the number of cycles N, with curve a) corresponding to the test at 4.3 V and curve b) corresponding to the test at 4.4 V. A power signature has also been determined, which shows the performance of the material as a function of the charge/discharge rate applied, the results being represented in FIG. 3 appended hereto, which illustrates the course of the capacitance C (in mAh/g) as a function of the charge/discharge rate applied (indicated by the ordinate $C_{rate}$), with curve a) corresponding to the 4.3V-2.7V test and curve b) corresponding to the 4.4V-2.7V test.

The performance achieved by the material is excellent.

Example 2

This example is directed to the preparation of a lamellar oxide of the formula $LiNi_{0.9}Co_{0.05}Ti_{0.05}O_2$.

Firstly, a solution is prepared by dissolving nickel sulphate (191.2 g), cobalt sulphate (11.4 g) in water (380.7 g). To this solution, is added a solution of diammonium bis (lactalo)dihydroxide titanate (23.5 g at 50 mass %) of the following formula:

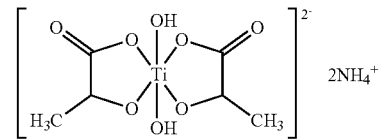

whereby the resulting solution is a 2 M equimolar solution (having a volume of approximately 400 mL). A 5 M soda solution is prepared separately as well as a dilute ammonia solution (150.2 g of 28 mass % ammonia diluted with 233.1 g of water).

The three solutions have separate injection circuits allowing the solutions to be pumped into a 5 L co-precipitation reactor, into which 1 L of water and 150 g of 28% ammonia have been previously introduced. The temperature is raised to 50° C. and the content of the reactor is maintained under stirring at 1000 rpm. An auxiliary circuit of inert gas (argon or nitrogen) is used to deoxygenate the solution while maintaining the reactor under an inert atmosphere. The solution containing the metal elements is pumped into the reactor up to 360 mL.

During the whole operation, the ammonia and soda solutions are injected concurrently to maintain a constant pH of 11. Once the metal solution is introduced, the solution is maintained under stirring for 3 hours. The solution is then filtered and the precipitate washed with hot water to remove any sulphate and sodium ions potentially adsorbed on the surface of the material. The mixed hydroxide precipitate of the formula $Ni_{0.9}Co_{0.05}Ti_{0.05}(OH)_2$ is then dried under vacuum at 80° C. overnight.

Secondly, the hydroxide of the formula $Ni_{0.9}Co_{0.05}Ti_{0.05}(OH)_2$ is then mixed with lithium carbonate (3% molar excess relative to the stoichiometry) and calcined at 850° C. for 12 hours under oxygen to form the compound $LiNi_{0.9}Co_{0.05}Ti_{0.05}O_2$.

The material is then characterised by X-ray diffraction. The X-ray diffraction pattern obtained is characteristic of a lamellar oxide with the space group R-3 m.

Elemental analyses by ICP and XRF have been carried out on the material, the characterisations yielding the following chemical formulae for the synthesised material:

$LiNi_{0.88}Co_{0.06}Ti_{0.06}O_2$ in case of ICP; and
$LiNi_{0.88}Co_{0.06}Ti_{0.06}O_2$ in case of XRF.

The material has then been characterised electrochemically in a button cell. To do so, the synthesised powder is mixed with a carbon source (SuperP®), PVDF 5130 in N-methyl-2-pyrrolidone (NMP). The mass composition of the mixture represents the following ratio 80/10/10 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into the glove box and a button cell is assembled by using lithium metal as the anode, Celgard 2400° as a separator and an electrolyte (1M $LiPF_6$ in a mixture of EC/PC/DMC carbonate solvents, EC corresponding to ethylene carbonate, PC to propylene carbonate and DMC corresponding to dimethyl carbonate).

Figure 4:
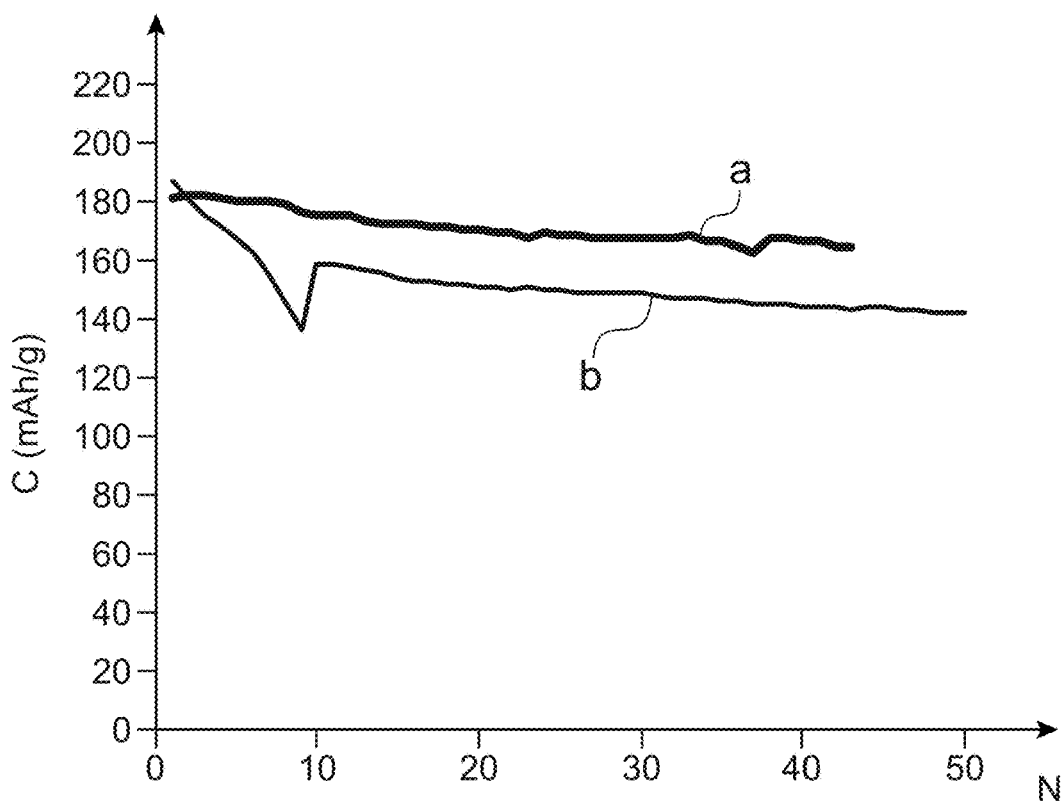
FIG. 4 is a graph illustrating, for example 2, the course of the capacitance C (in mAg/h) as a function of the number of cycles N, with curve a) corresponding to that obtained for cycling at C/10 and curve b) corresponding to that obtained for cycling at 1 C.

The performance of the button cell comprising the titanium-doped material is measured by cycling at C/10 and 1 C, the results being represented in FIG. 4, which is a graph illustrating the course of the capacitance C (in mAg/h) as a function of the number of cycles N, with curve a) corresponding to that obtained for cycling at C/10 and curve b) corresponding to that obtained for cycling at 1 C.

Figure 5:
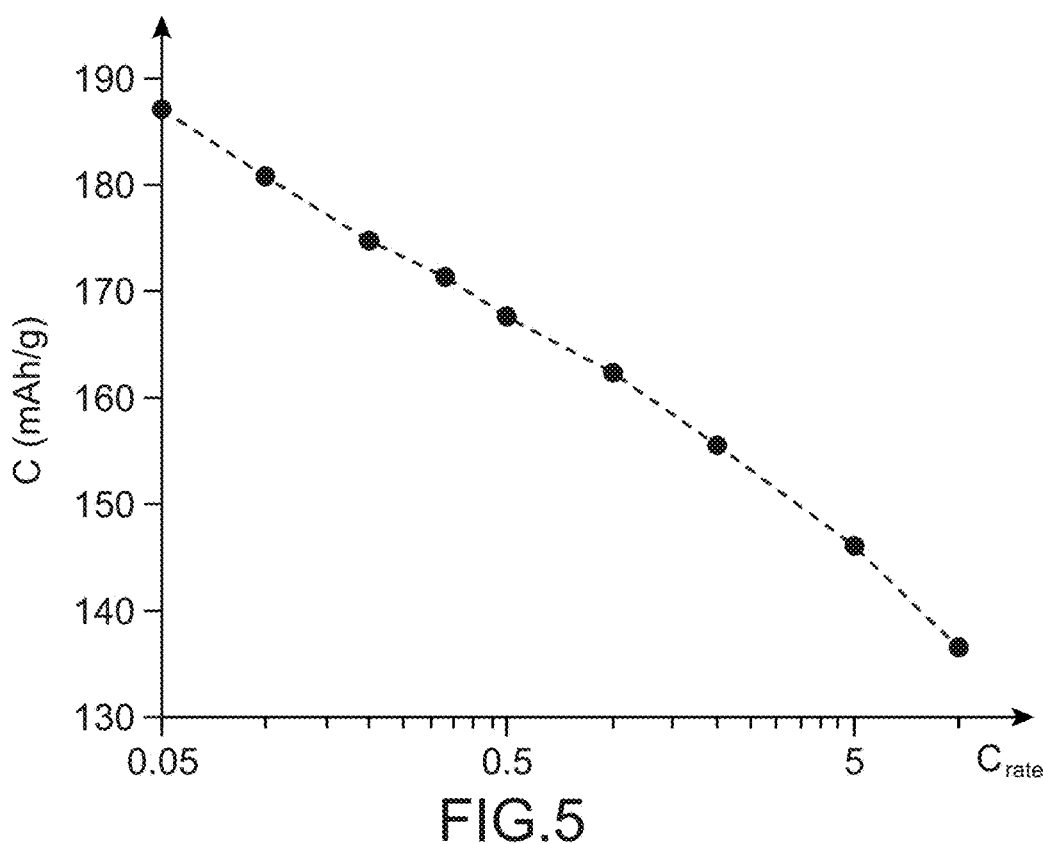
FIG. 5 is a graph illustrating, for example 2, the course of the capacitance C (in mAh/g) as a function of the charge/discharge rate applied (indicated by $C_{rate}$ on the ordinate)

A power signature has also been determined which shows the performance of the material as a function of the applied charge/discharge rate, the results being represented in FIG. 5 appended hereto, which illustrates the course of the capacitance C (in mAh/g) as a function of the charge/discharge rate applied (indicated by the ordinate $C_{rate}$).

These results highlight an attractive performance.

Example 3

The present example is directed to the preparation of a lamellar oxide of the formula $LiNi_{0.8}Co_{0.1}Ti_{0.1}O_2$.

Firstly, a solution is prepared by dissolving nickel sulphate (169.9 g), cobalt sulphate (22.7 g) in water (361.5 g). To this solution, is added a solution of diammonium bis (lactalo)dihydroxide titanate (47.1 g at 50 mass %) of the following formula:

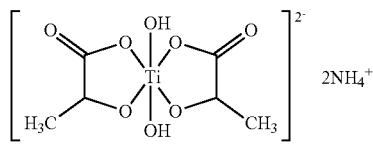

whereby the resulting solution is a 2 M equimolar solution (having a volume of approximately 400 mL). A 5 M soda solution is prepared separately as well as a dilute ammonia solution (150.2 g of 28 mass % ammonia diluted with 233.1 g of water).

The three solutions have separate injection circuits allowing the solutions to be pumped into a 5 L co-precipitation reactor, into which 1 L of water and 150 g of a 28% ammonia solution have been previously introduced. The temperature is raised to 50° C. and the content of the reactor is maintained under stirring at 1000 rpm. An auxiliary inert gas circuit (argon or nitrogen) is used to deoxygenate the solution while maintaining the reactor under an inert atmosphere. The solution containing the metal elements is pumped into the reactor up to 360 mL.

During the whole operation, the ammonia and soda solutions are injected concurrently to maintain a constant pH of 11. Once the metal solution is introduced, the solution is maintained under stirring for 3 hours. The solution is then filtered and the precipitate washed with hot water to remove any sulphate and sodium ions potentially adsorbed on the surface of the material. The mixed hydroxide precipitate of the formula $Ni_{0.8}Co_{0.1}Ti_{0.1}(OH)_2$ is then dried under vacuum at 80° C. overnight.

Secondly, the hydroxide of the formula $Ni_{0.8}Co_{0.1}Ti_{0.1}(OH)_2$ is then mixed with lithium carbonate (3% molar excess relative to the stoichiometry) and calcined under oxygen at 850° C. for 12 hours to form the compound $LiNi_{0.8}Co_{0.1}Ti_{0.1}O_2$.

The material is then characterised by X-ray diffraction. The X-ray diffraction pattern obtained is characteristic of a lamellar oxide with the space group R-3 m.

Elemental analyses by ICP and XRF have been carried out on the material, the characterisations yielding the following chemical formulae for the synthesised material:

$LiNi_{0.73}Co_{0.14}Ti_{0.13}O_2$ in the case of ICP; and
$LiNi_{0.73}Co_{0.14}Ti_{0.013}O_2$ in the case of XRF.

The material has then been characterised electrochemically in a button cell. To do so, the synthesised powder is mixed with a carbon source (SuperP®), PVDF 5130 in N-methyl-2-pyrrolidone (NMP). The mass composition of the mixture represents the following ratio 80/10/10 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into the glove box and a button cell is assembled by using lithium metal as the anode, Celgard 2400° as a separator and an electrolyte (1 M $LiPF_6$ in a mixture of EC/PC/DMC carbonate solvents, EC corresponding to ethylene carbonate, PC to propylene carbonate and DMC corresponding to dimethyl carbonate).

Figure 6:
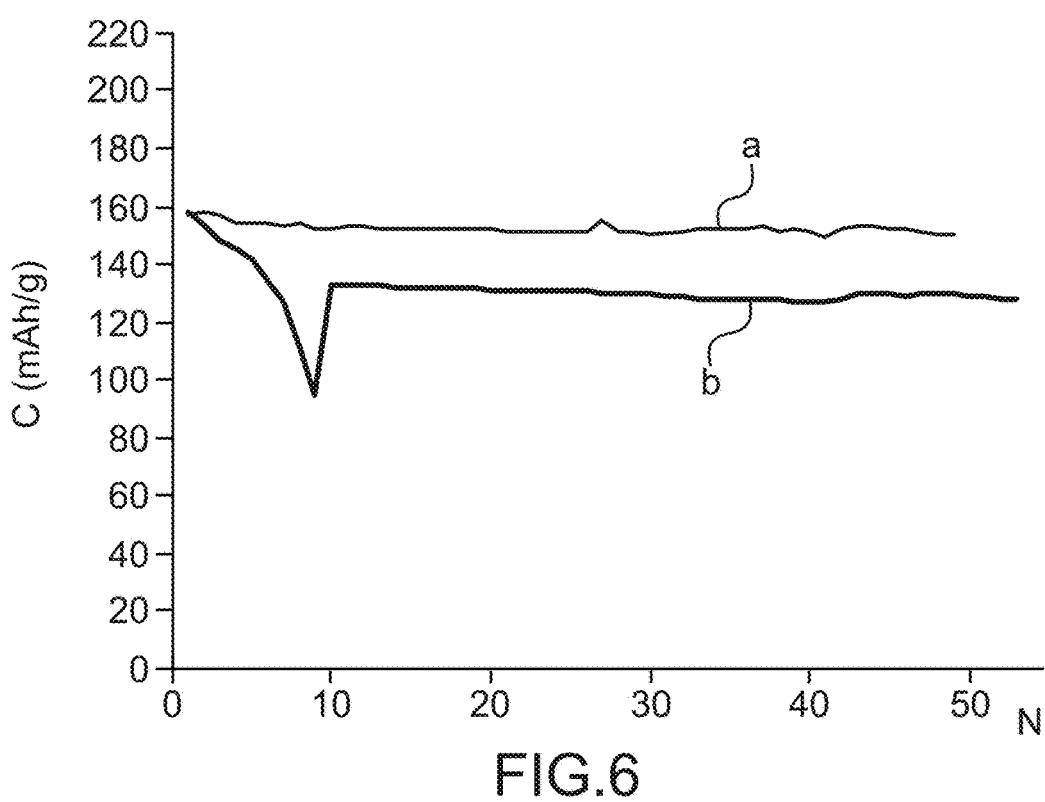
FIG. 6 is a graph illustrating, for example 3, the course of the capacitance C (in mAg/h) as a function of the number of cycles N, with curve a) corresponding to that obtained for cycling at C/10 and curve b) corresponding to that obtained for cycling at 1 C.

The performance of the button cell comprising the titanium-doped material is measured by cycling at C/10 and at 1 C, the results being represented in FIG. 6, which is a graph illustrating the course of the capacitance C (in mAg/h) as a function of the number of cycles N, with curve a) corresponding to that obtained for cycling at C/10 and curve b) corresponding to that obtained for cycling at 1 C.

Figure 7:
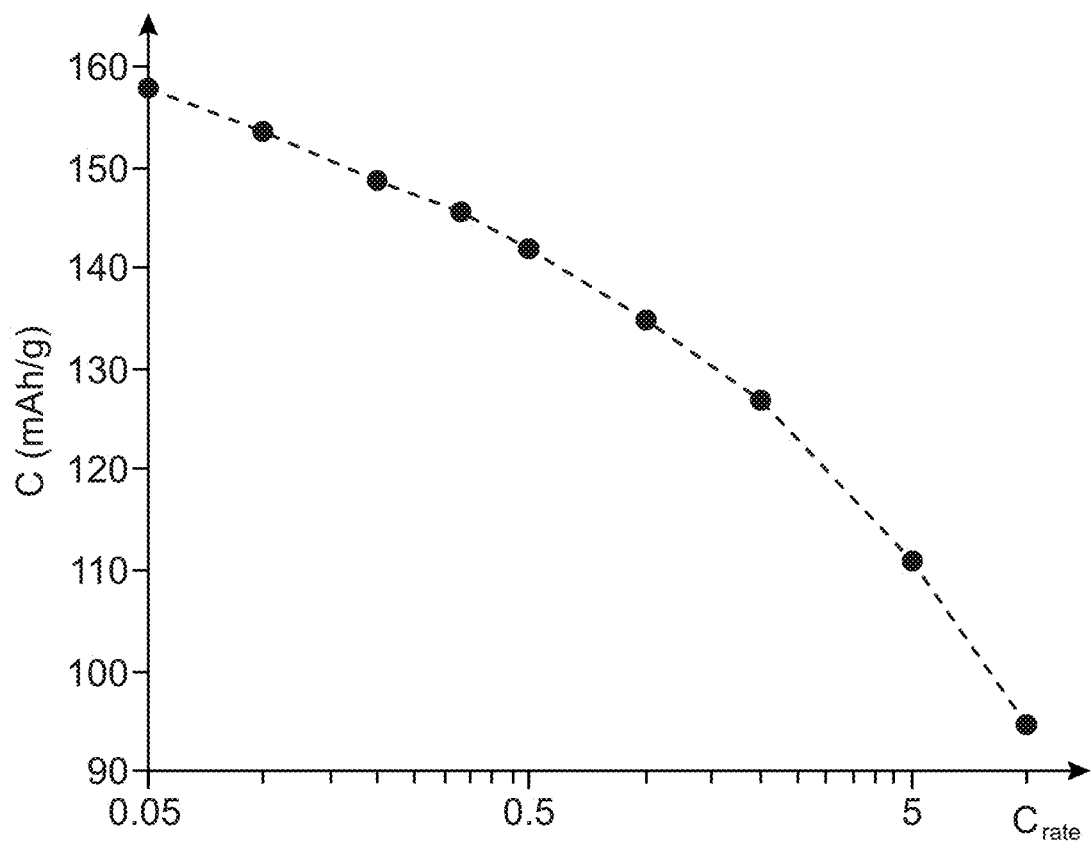
FIG. 7 is a graph illustrating, for example 3, the course of the capacitance C (in mAh/g) as a function of the charge/discharge rate applied (indicated by $C_{rate}$ on the ordinate).

A power signature has also been determined which shows the performance of the material as a function of the charge/discharge rate applied, the results being represented in FIG. 7 appended hereto, which illustrates the course of the capacitance C (in mAh/g) as a function of different charge/discharge rates (indicated by the ordinate $C_{rate}$).

These results highlight an attractive performance.

Example 4

The present example is directed to the preparation of a lithiated oxide of spinel type structure having the formula $LiNi_{0.5}Mn_{1.48}Ti_{0.02}O_4$.

Firstly, a solution is prepared by dissolving nickel sulphate (53.1 g), manganese sulphate (101.1 g) in water (396.1 g). To this solution, is added a solution of diammonium bis(lactalo)dihydroxide titanate (4.7 g at 50 mass %) of the following formula:

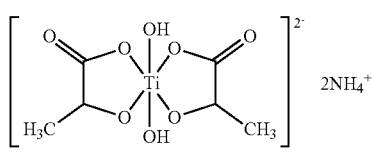

whereby the resulting solution is a 2 M equimolar solution (having a volume of approximately 400 mL). A solution comprised of 134.2 g of sodium carbonate and ammonia (31.5 g of 28 mass % ammonia) diluted in water (565 g) is prepared separately.

The two solutions have separate injection circuits allowing the solutions to be pumped into a 5 L co-precipitation reactor, into which 1 L of water has been previously introduced. The temperature is raised to 50° C. and the content of the reactor is maintained under stirring at 1000 rpm. An auxiliary inert gas circuit (argon or nitrogen) is used to deoxygenate the solution while maintaining the reactor under an inert atmosphere. The solution containing the metal elements is pumped into the reactor up to 360 mL.

During the whole operation, the solution comprised of sodium carbonate and ammonia is injected concurrently to maintain a constant pH of 7.5. Once the metal solution is introduced, the solution is maintained under stirring overnight. The solution is then filtered and the precipitate washed with hot water to remove any sulphate and sodium ions potentially adsorbed on the surface of the material. The carbonate precipitate of the formula $Ni_{0.25}Mn_{0.74}Ti_{0.01}CO_3$ is then dried under vacuum at 80° C. overnight.

Secondly, the carbonate of the formula $Ni_{0.25}Mn_{0.74}Ti_{0.01}CO_3$ is then mixed with lithium carbonate (3% molar excess relative to the stoichiometry) and calcined under air at 950° C. for 6 hours to form the compound $LiNi_{0.5}Mn_{1.48}Ti_{0.02}O_4$.

The material is then characterised by X-ray diffraction. The X-ray diffraction pattern obtained is characteristic of a spinel type material with the space group Fd-3m.

The material has then been characterised electrochemically in a button cell. To do so, the synthesised powder is mixed with a carbon source (SuperP®), PVDF 8130 in N-methyl-2-pyrrolidone (NMP). The mass composition of the mixture represents the following ratio 90/5/5 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into a glove box and a button cell is then assembled by using lithium metal as the anode, Celgard 2400® as a separator and an electrolyte (1M $LiPF_6$ in a mixture of EC/PC/DMC carbonate solvents, EC corresponding to ethylene carbonate, PC to propylene carbonate and DMC to dimethyl carbonate).

Figure 8:
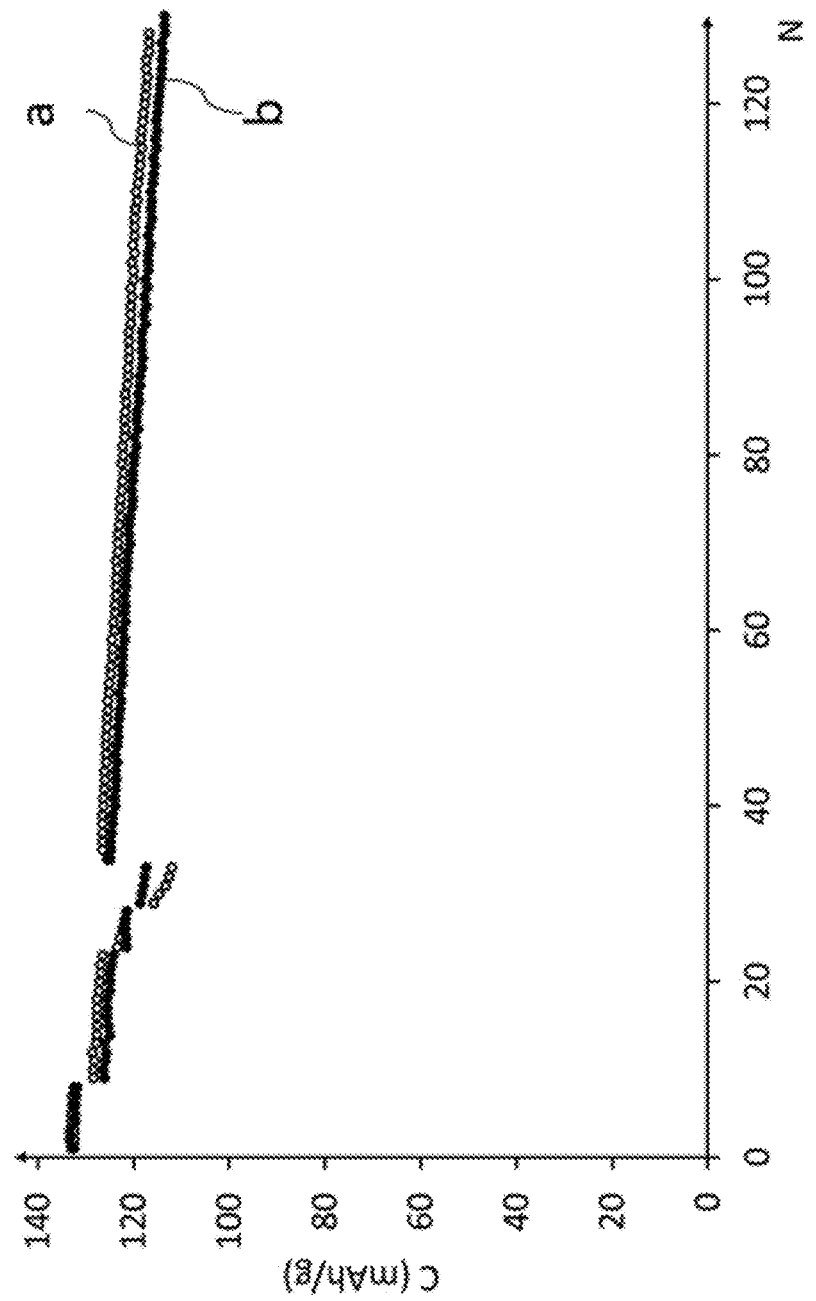
FIG. 8 illustrates, for example 4, a graph representing the course of the capacitance C (in mAh/g) as a function of the number of cycles N, with curve a) corresponding to that obtained with the button cell comprising the titanium-doped material and curve b) corresponding to that obtained with the button cell comprising the non-titanium-doped material.
Figure 9:
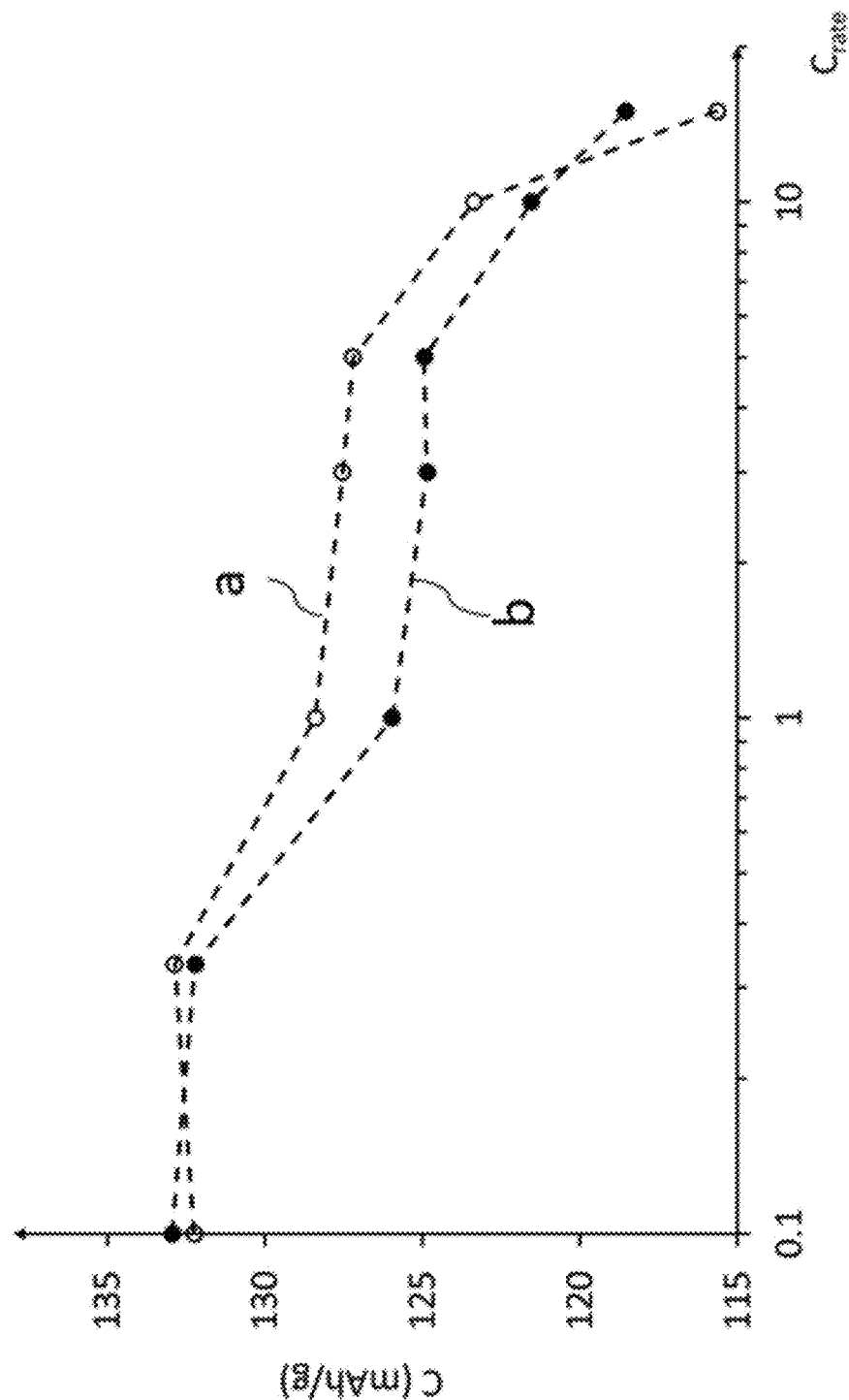
FIG. 9 is a graph illustrating, for example 4, the course of the capacitance C (in mAh/g) as a function of the charge/discharge rate applied (indicated by the ordinate $C_{rate}$), with curve a) corresponding to the 4.9V-3V test of the titanium-doped material and curve b) corresponding to the 4.9V-3V test of the non-titanium-doped material.

Concurrently, a button cell has been made in the same way as above, except that the positive electrode active material is not doped with titanium, this material having the formula $LiNi_{0.5}Mn_{1.5}O_4$. A comparison of the performance of the button cell comprising the titanium-doped material and the button cell comprising the non-titanium-doped material is set forth in FIG. 8 appended hereto, which is a graph illustrating the course of the capacitance C (in mAh/g) as a function of the number of cycles N, with curve a) corresponding to that obtained with the button cell comprising the titanium-doped material and curve b) corresponding to that obtained with the button cell comprising the non-titanium-doped material. A power signature of the material is first carried out from C/10 to 15 C over the first 35 cycles (3 cycles at C/10, 5 cycles at C/3, 5 cycles at C, 5 cycles at 3 C, 5 cycles at 5 C, 5 cycles at 10 C, 5 cycles at 15 C) between 4.9 V and 3 V followed by cycling at 1 C over about one hundred cycles. It appears that the material with 1.3% titanium is more stable than the undoped material. This power signature shows the performance of the material as a function of the charge/discharge rate applied. The power behaviour is more clearly illustrated in the FIG. 9 appended hereto, which illustrates the course of the capacitance C (in mAh/g) as a function of the charge/discharge rate applied (indicated by the ordinate $C_{rate}$), with curve a) corresponding to the 4.9 V-3 V test of the titanium-doped material and curve b) corresponding to the 4.9 V-3 V test of the non-titanium-doped material.

Figure 10:
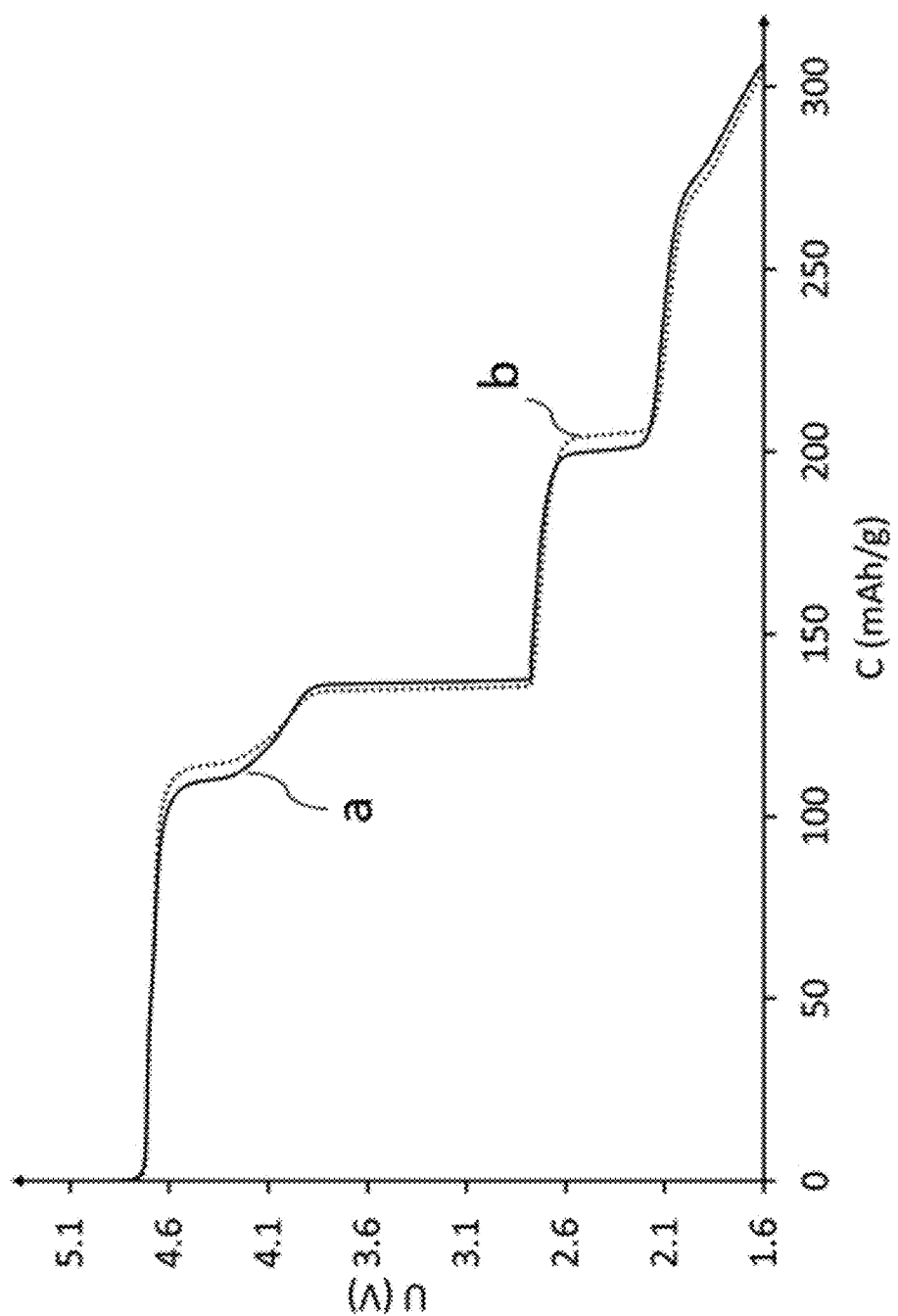
FIG. 10 is a graph illustrating, for example 4, the course of the voltage U (in V) as a function of the capacitance C (in mAh/g).

Other button cells have been made in the same way as the previous ones and cycled at C/10 over a range of 5.1 V-1.6 V to evaluate the effect of titanium doping on the behaviour of manganese. The results are set forth in FIG. 10 which illustrates the discharge of the material as a function of the measurement potential (curve a) for the doped material and curve b) for the undoped material).

The performance achieved by the material is excellent.

Example 5

This example is directed to the preparation of a spinel of the formula $LiNi_{0.5}Mn_{1.46}Ti_{0.04}O_4$.

Firstly, a solution is prepared by dissolving nickel sulphate (53.1 g), manganese sulphate (99.7 g) in water (392.3 g). To this solution, is added a solution of diammonium bis(lactalo)dihydroxide titanate (9.4 g at 50 mass %) of the following formula:

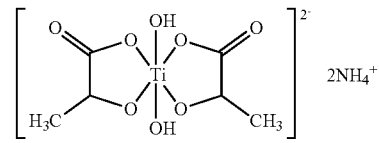

whereby the resulting solution is a 2 M equimolar solution (having a volume of approximately 400 mL). A solution comprised of 134.2 g of sodium carbonate and ammonia (31.5 g of 28 mass % ammonia) diluted in water (565 g) is prepared separately.

The two solutions have separate injection circuits allowing the solutions to be pumped into a 5 L co-precipitation reactor, into which 1 L of water has been previously introduced. The temperature is raised to 50° C. and the content of the reactor is maintained under stirring at 1000 rpm. An auxiliary inert gas circuit (argon or nitrogen) is used to deoxygenate the solution while maintaining the reactor under an inert atmosphere. The solution containing the metal elements is pumped into the reactor up to 360 mL.

During the whole operation, the solution comprised of sodium carbonate and ammonia is injected concurrently to maintain a constant pH of 7.5. Once the metal solution is introduced, the solution is maintained under stirring overnight. The solution is then filtered and the precipitate washed with hot water to remove any sulphate and sodium ions potentially adsorbed on the surface of the material. The carbonate precipitate of the formula $Ni_{0.25}Mn_{0.73}Ti_{0.02}CO_3$ is then dried under vacuum at 80° C. overnight.

Secondly, the carbonate of the formula $Ni_{0.25}Mn_{0.73}Ti_{0.02}CO_3$ is then mixed with lithium carbonate (3% molar excess relative to the stoichiometry) and calcined under air at 950° C. for 6 hours to form the compound of the formula $LiNi_{0.5}Mn_{1.46}Ti_{0.04}O_4$.

The material is then characterised by X-ray diffraction. The X-ray diffraction pattern obtained is characteristic of a spinel type material with the space group Fd-3m.

The material has then been characterised electrochemically in a button cell. To do so, the synthesised powder is mixed with a carbon source (SuperP®), PVDF 8130 in N-methyl-2-pyrrolidone (NMP). The mass composition of the mixture represents the following ratio 90/5/5 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into a glove box and a button cell is assembled by using lithium metal as the anode, Celgard 2400° as a separator and an electrolyte (1M $LiPF_6$ in a mixture of EC/PC/DMC carbonate solvents, EC corresponding to ethylene carbonate, PC to propylene carbonate and DMC to dimethyl carbonate).

Figure 11:
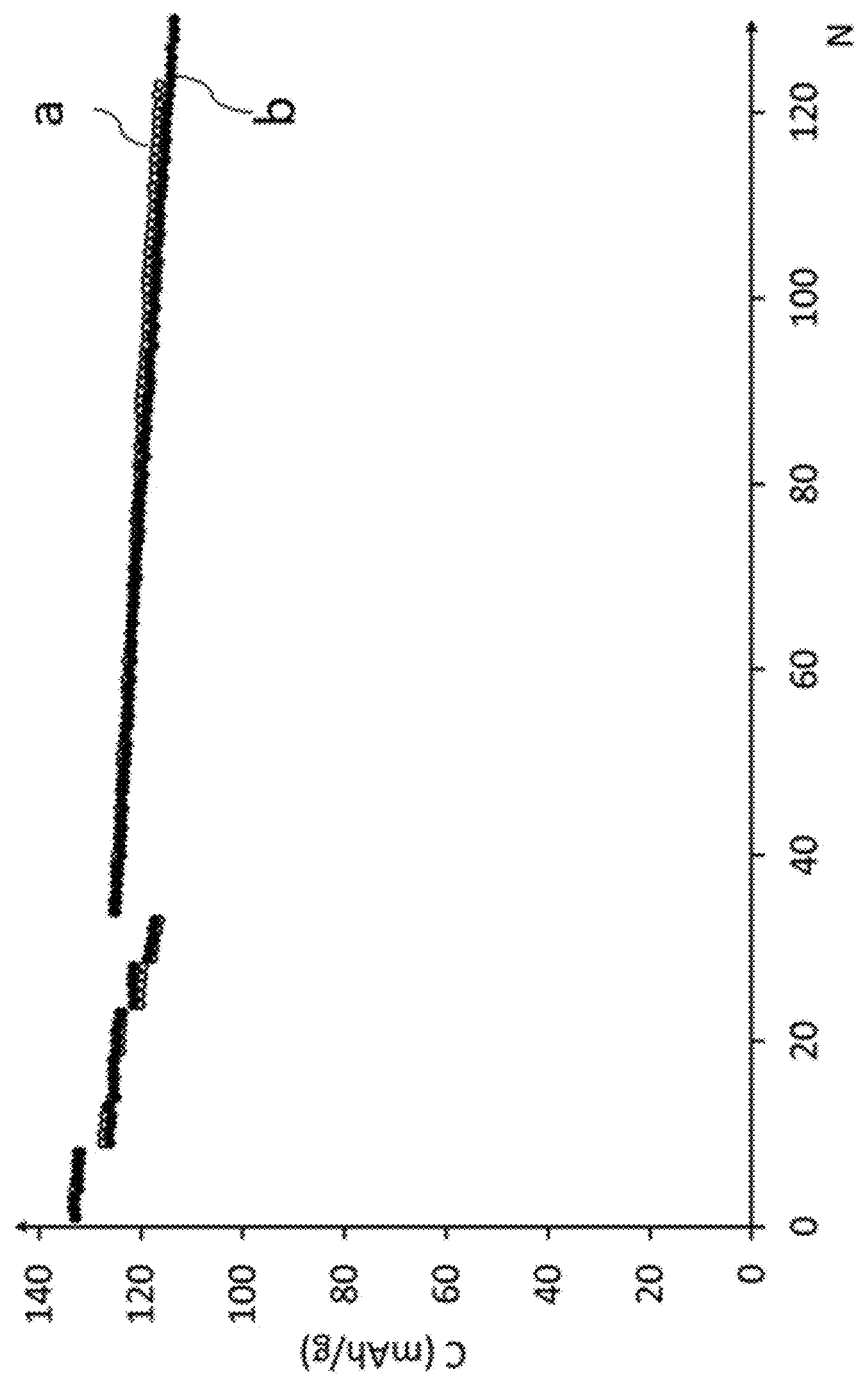
FIG. 11 is a graph illustrating, for example 5, the course of the capacitance C (in mAh/g) as a function of the number of cycles N, with curve a) corresponding to that obtained with the button cell comprising the titanium-doped material and curve b) corresponding to that obtained with the button cell comprising the non-titanium-doped material.
Figure 12:
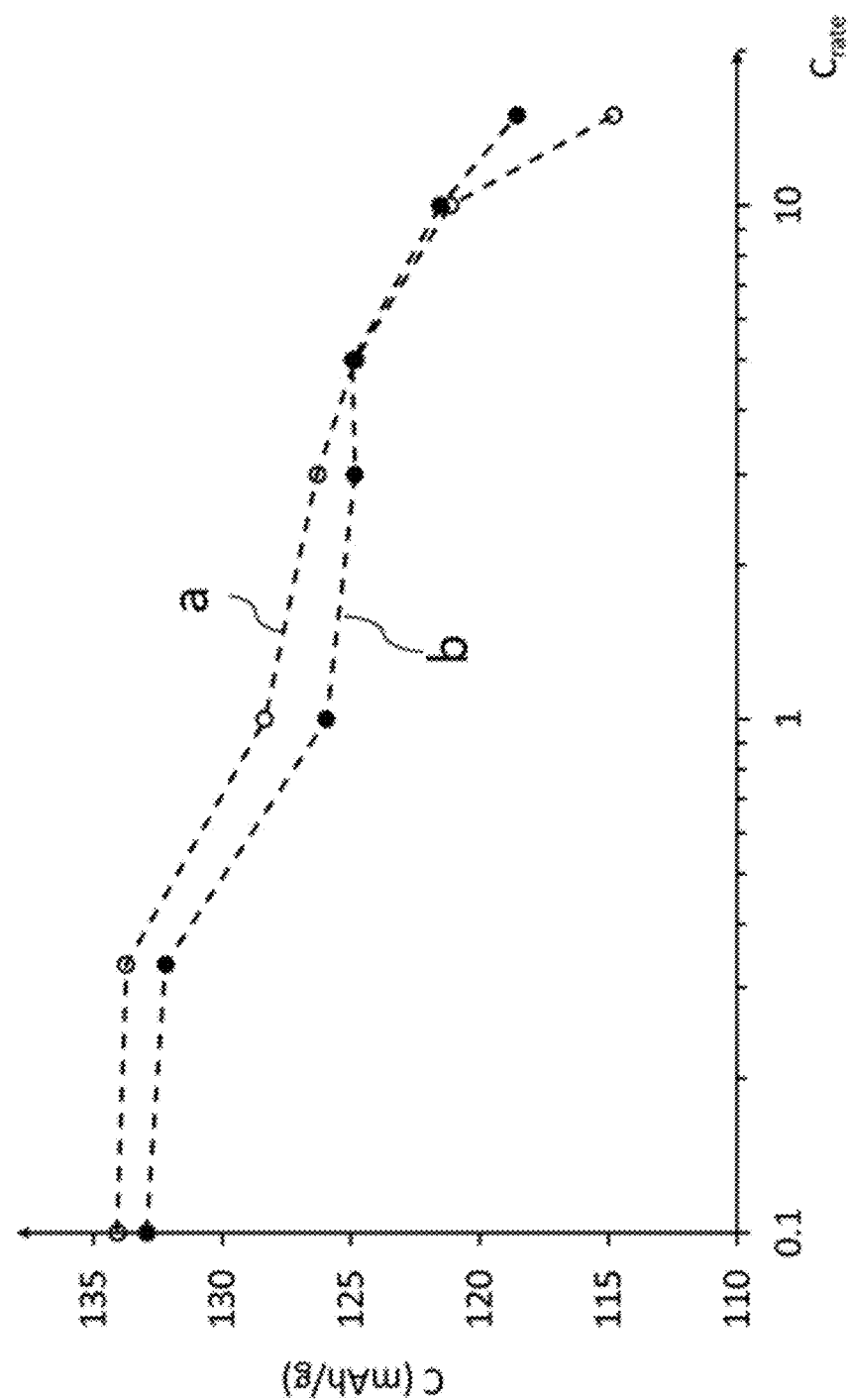
FIG. 12 is a graph illustrating, for example 5, the course of the capacitance C (in mAh/g) as a function of the charge/discharge rate applied (indicated by the ordinate $C_{rate}$), with curve a) corresponding to the 4.9V-3V test of the titanium-doped material and curve b) corresponding to the 4.9V-3V test of the non-titanium-doped material.

Concurrently, a button cell has been made in the same way as above, except that the positive electrode active material was not doped with titanium, this material having the formula $LiNi_{0.5}Mn_{1.5}O_4$. A comparison of the performance of the button cell comprising the titanium-doped material and the button cell comprising the non-titanium-doped material is set forth in FIG. 11 appended hereto, which is a graph illustrating the course of the capacitance C (in mAh/g) as a function of the number of cycles N, with curve a) corresponding to that obtained with the button cell comprising the titanium-doped material and curve b) corresponding to that obtained with the button cell comprising the non-titanium-doped material. A power signature of the material is first carried out from C/10 to 15 C over the first 35 cycles (3 cycles at C/10, 5 cycles at C/3, 5 cycles at C, 5 cycles at 3 C, 5 cycles at 5 C, 5 cycles at 10 C, 5 cycles at 15 C) between 4.9 V and 3 V followed by cycling at 1 C over about one hundred cycles. It appears that the material with 2.7% titanium is more stable than the undoped material. This power signature shows the performance of the material as a function of the charge/discharge rate applied. The power behaviour is more clearly represented in the FIG. 12 appended hereto, which illustrates the course of the capacitance C (in mAh/g) as a function of the charge/discharge rate applied (indicated by the ordinate $C_{rate}$), with curve a) corresponding to the 4.9 V-3 V test of the titanium-doped material and curve b) corresponding to the 4.9 V-3 V test of the non-titanium-doped material.

Figure 13:
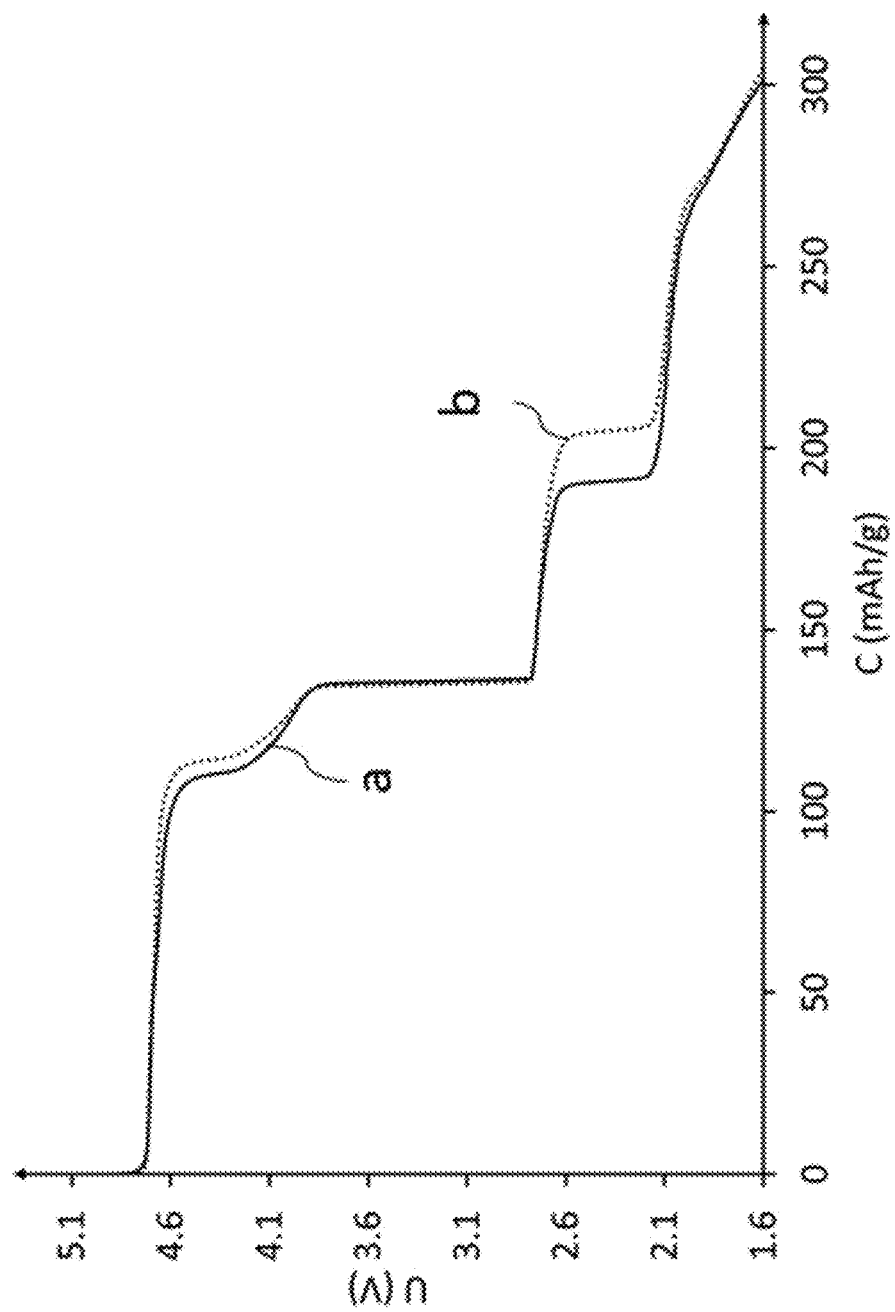
FIG. 13 is a graph illustrating, for example 5, the course of the voltage U (in V) as a function of the capacitance C (in mAh/g).

Other button cells have been made in the same way as the previous ones and cycled at C/10 over a range of 5.1 V-1.6 V to evaluate the effect of titanium doping on the manganese behaviour. The results are set forth in FIG. 13 in the appendix, which illustrates the discharge of the material as a function of the measurement potential.

The performance achieved by the material is excellent.

Example 6

This example is directed to the preparation of a spinel of the formula $LiNi_{0.5}Mn_{1.1}Ti_{0.4}O_4$.

Firstly, a solution is prepared by dissolving nickel sulphate (53.1 g), manganese sulphate (75.1 g) in water (323.0 g). To this solution, is added a solution of diammonium bis(lactalo)dihydroxide titanate (94.1 g at 50 mass %) of the following formula:

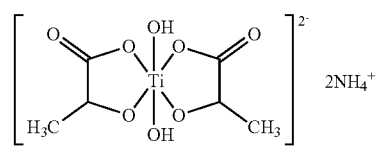

whereby the resulting solution is a 2 M equimolar solution (having a volume of approximately 400 mL). A solution comprised of 134.2 g of sodium carbonate and ammonia (31.5 g of 28 mass % ammonia) diluted in water (565 g) is prepared separately.

The two solutions have separate injection circuits allowing the solutions to be pumped into a 5 L co-precipitation reactor, into which 1 L of water has been previously introduced. The temperature is raised to 50° C. and the content of the reactor is maintained under stirring at 1000 rpm. An auxiliary inert gas circuit (argon or nitrogen) is used to deoxygenate the solution while maintaining the reactor under an inert atmosphere. The solution containing the metal elements is pumped into the reactor up to 360 mL.

During the whole operation, the solution comprised of sodium carbonate and ammonia is injected concurrently to maintain a constant pH of 7.5. Once the metal solution is introduced, the solution is maintained under stirring overnight. The solution is then filtered and the precipitate washed with hot water to remove any sulphate and sodium ions potentially adsorbed on the surface of the material. The carbonate precipitate of the formula $Ni_{0.25}Mn_{0.55}Ti_{0.2}CO_3$ is then dried under vacuum at 80° C. overnight.

Secondly, the carbonate of the formula $Ni_{0.25}Mn_{0.55}Ti_{0.2}CO_3$ is then mixed with lithium carbonate (3% molar excess relative to the stoichiometry) and calcined under air at 950° C. for 6 hours to form the compound of the formula $LiNi_{0.5}Mn_{1.1}Ti_{0.4}O_4$.

The material is then characterised by X-ray diffraction. The X-ray diffraction pattern obtained is characteristic of a spinel type material with the space group Fd-3m.

The material has then been characterised electrochemically in a button cell. To do so, the synthesised powder is mixed with a carbon source (SuperP®), PVDF 8130 in N-methyl-2-pyrrolidone (NMP). The mass composition of the mixture represents the following ratio 90/5/5 (material/PVDF/Carbon). The mixture thus formed is coated onto an aluminium foil and left to dry for 24 hours at 60° C. to evaporate the NMP. From this foil thus coated, a 14 mm disk is then cut and dried under vacuum for 48 hours at 80° C. The electrode thus formed is then inserted into a glove box and a button cell is assembled by using lithium metal as the anode, Celgard 2400° as a separator and an electrolyte (1 M $LiPF_6$ in a mixture of EC/PC/DMC carbonate solvents, EC corresponding to ethylene carbonate, PC to propylene carbonate and DMC to dimethyl carbonate).

Figure 14:
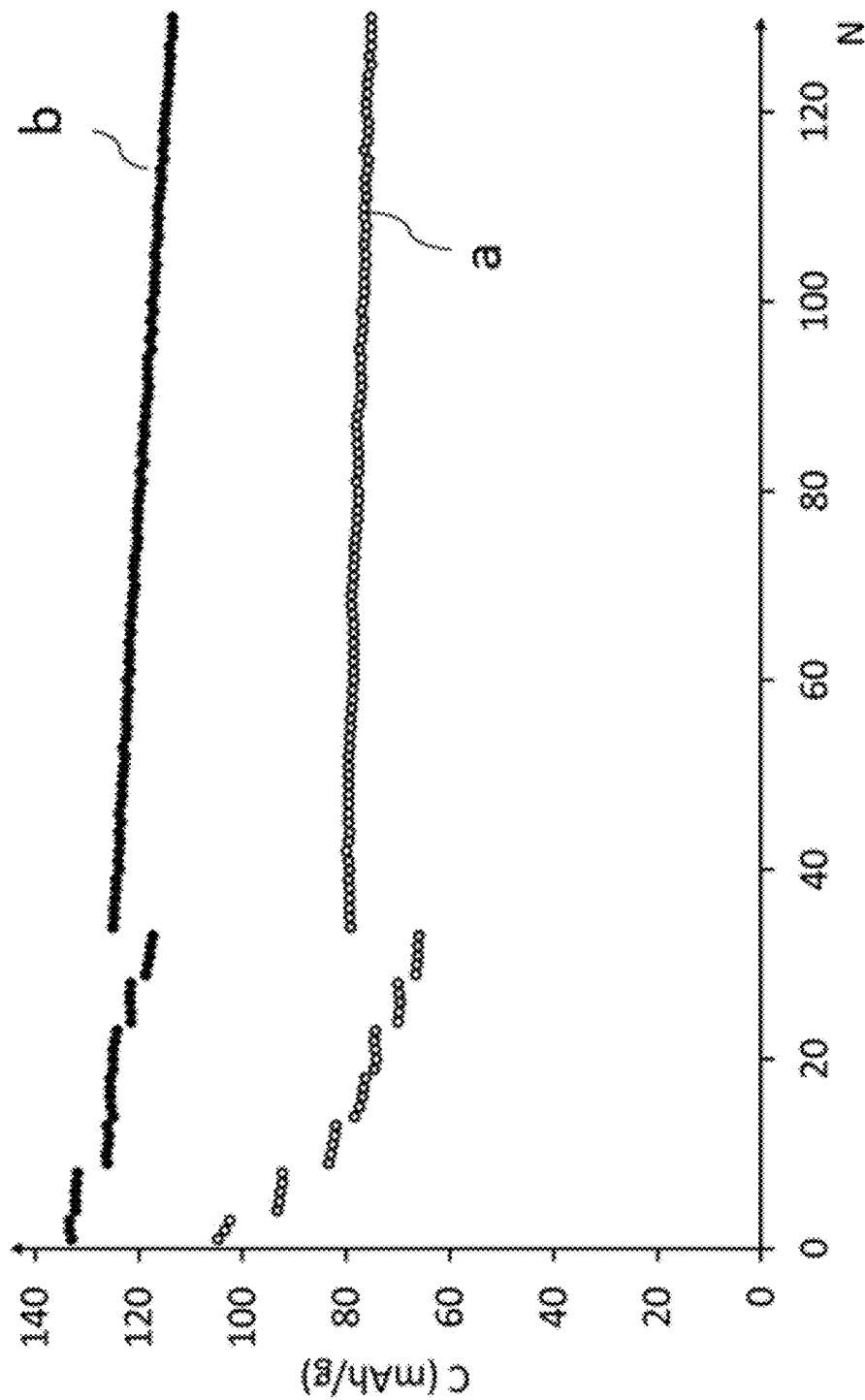
FIG. 14 illustrates, for example 6, a graph representing the course of the capacitance C (in mAh/g) as a function of the number of cycles N, with curve a) corresponding to that obtained with the button cell comprising the titanium-substituted material and curve b) corresponding to that obtained with the button cell comprising the material without the presence of titanium.
Figure 15:
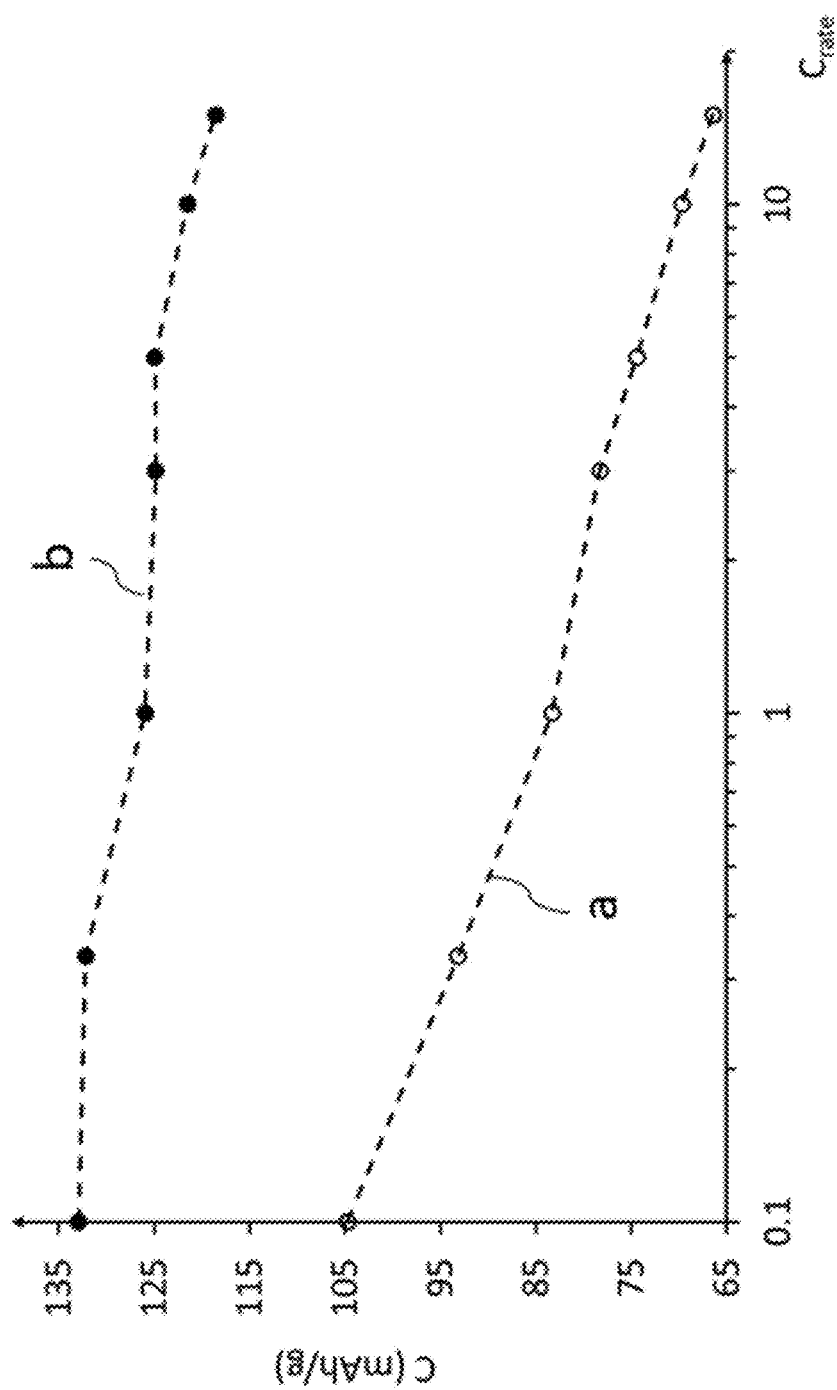
FIG. 15 illustrates, for example 6, a graph representing the course of the capacitance C (in mAh/g) as a function of the charge/discharge rate applied (indicated by the ordinate $C_{rate}$), with curve a) corresponding to the 4.9V-3V test of the titanium-substituted material and curve b) corresponding to the 4.9V-3V test of the material without the presence of titanium.

Concurrently, a button cell has been made in the same way as above, except that the positive electrode active material was without titanium, this material having the formula $LiNi_{0.5}Mn_{1.5}O_4$. A comparison of the performance of the button cell comprising the titanium-substituted material and the button cell comprising the material without the presence of titanium is set forth in FIG. 14 appended hereto, which is a graph illustrating the course of the capacitance C (in mAh/g) as a function of the number of cycles N, with curve a) corresponding to that obtained with the button cell comprising the titanium-substituted material and curve b) corresponding to that obtained with the button cell comprising the material without the presence of titanium. A power signature of the material is first carried out from C/10 to 15 C over the first 35 cycles (3 cycles at C/10, 5 cycles at C/3, 5 cycles at C, 5 cycles at 3 C, 5 cycles at 5 C, 5 cycles at 10 C, 5 cycles at 15 C between 4.9 V and 3 V) followed by a cycling at 1 C over about one hundred cycles. It appears that the material with 36% titanium is more stable than the material without titanium. This power signature shows the performance of the material as a function of the charge/discharge rate applied. The power behaviour is more clearly represented in the FIG. 15 appended hereto, which illustrates the course of the capacitance C (in mAh/g) as a function of the charge/discharge rate applied (indicated by the ordinate $C_{rate}$), with curve a) corresponding to the 4.9 V-3 V test of the titanium-substituted material and curve b) corresponding to the 4.9 V-3 V test of the material without the presence of titanium.

Figure 16:
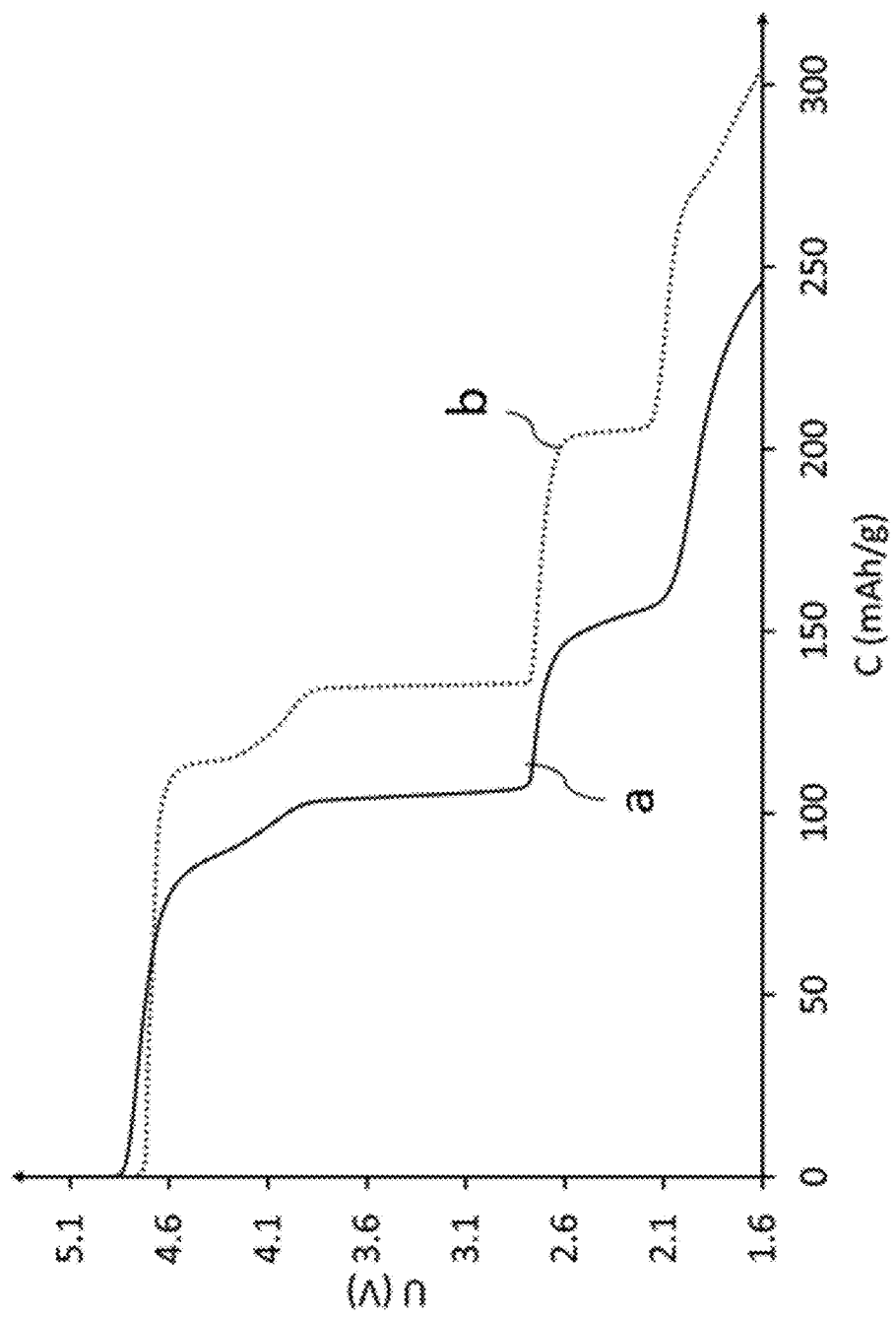
FIG. 16 shows a graph illustrating, for example 6, the course of the voltage U (in V) as a function of the capacitance C (in mAh/g).

Other button cells have been made in the same way as the previous ones and cycled at C/10 over a range of 5.1 V-1.6 V to evaluate the effect of manganese substitution with titanium on the behaviour of the material. The results are set forth in FIG. 16 of the appendix, which illustrates the discharge of the material as a function of the measurement potential.

The performance achieved by the material is lower than that of the unsubstituted material but in the same orders of magnitude as materials described in scientific journals, such as in P. Strobel et al, «Effect of tetravalent cation on 5 V redox mechanism in $LiNi_{0.5}M_{1.5}O_4$ spinels», *Meet. Abstr.* MA2010-03 572, 2010. and M. Lin et al, «A strategy to improve cyclic performance of $LiNi_{0.5}M_{1.5}O_4$ in a wide voltage region by Ti-doping», *Journal of the Electrochemical Society*, 160 (5) A3036-A3040 (2013).

What is claimed is:

1. A method for preparing a positive electrode active material for a lithium battery, the positive electrode active material consisting of a lithiated oxide, wherein the lithiated oxide comprises titanium and optionally one or more other metal elements, the method comprising the following successive steps:
   a) a step of forming a precipitate comprising titanium and the optional other metal element(s) by contacting a titanium coordination complex which comprises at least one ligand comprising at least two groups establishing coordination bonds with titanium, and, if necessary, at least one salt of the other metal element(s), with a basic aqueous medium;
   b) a step of recovering the precipitate thus formed;
   c) a step of calcining the precipitate in the presence of a lithium source.

2. The preparation method according to claim 1, wherein the optional other metal element(s) is/are selected from transition metal elements, post-transition metal elements and mixtures thereof.

3. The preparation method according to claim 1, wherein the optional other metal element(s) is/are selected from manganese, cobalt, nickel and mixtures thereof.

4. The preparation method according to claim 1, wherein the lithiated oxide comprises titanium and optionally one or more other metal elements is selected from:
   lamellar oxides of the formula LiTiMO2, in which M denotes Co, Ni, Mn, Al, Cu, Fe and mixtures thereof;
   spinel type oxides of the formula LiTiMO4, in which M denotes Ni, Mn, Co, Cu, Al, Fe and mixtures thereof.

5. The method according to claim 1, wherein the titanium coordination complex comprises at least one bidentate ligand comprising a carboxylate group and an alcoholate group.

6. The method according to claim 1, wherein the titanium coordination complex further comprises at least one ligand comprising a single group establishing one coordination bond with titanium.

7. The method according to claim 6, wherein the ligand comprising a single group establishing one coordination bond with titanium is a ligand comprising, as the single group establishing one coordination bond with titanium, an —OH group.

8. The method according to claim 1, wherein the titanium coordination complex further comprises one or more cations to neutralise, if necessary, a backbone consisting of titanium and its ligands.

9. The method according to claim 1, wherein the titanium coordination complex is a complex of the following formula (I):

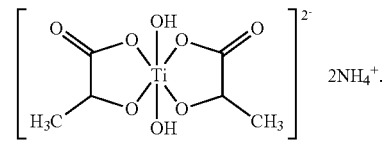

$2NH_4^+$.

10. The method according to claim 1, wherein the salt(s) of the optional other metal element(s) is/are nitrates, carbonates, chlorides, or sulphates of the other metal element(s).

11. The method according to claim 1, wherein the step of forming the precipitate is carried out under inert gas.

12. The method according to claim 1, wherein the lithium source is lithium carbonate, lithium hydroxide or lithium acetate.

13. The method according to claim 1, wherein the calcination step is carried out at a temperature ranging from 700° C. to 1000° C. for a duration ranging from 4 hours to 24 hours.

14. A method for preparing a lithiated oxide for use in a positive electrode active material for a lithium battery, the lithiated oxide comprising titanium and optionally one or more other metal elements, the method comprising the following successive steps:
   a) a step of forming a precipitate comprising titanium and the optional other metal element(s) by contacting a titanium coordination complex which comprises at least one ligand comprising at least two groups establishing coordination bonds with titanium, and, if necessary, at least one salt of the other metal element(s), with a basic aqueous medium;
   b) a step of recovering the precipitate thus formed;
   c) a step of calcining the precipitate in the presence of a lithium source.

* * * * *